United States Patent [19]

Blomqvist

[11] Patent Number: 5,591,292
[45] Date of Patent: Jan. 7, 1997

[54] WELDING METHOD IN THE MANUFACTURE OF A SPIRALLY WOUND TUBE AND A WELDING HEAD FOR PERFORMING THE METHOD

[75] Inventor: Gunnar Blomqvist, Helsingby, Finland

[73] Assignee: OY KWH Pipe AB, Vasa, Finland

[21] Appl. No.: 313,046

[22] PCT Filed: Apr. 29, 1993

[86] PCT No.: PCT/FI93/00182

§ 371 Date: Oct. 4, 1994

§ 102(e) Date: Oct. 4, 1994

[87] PCT Pub. No.: WO93/22126

PCT Pub. Date: Nov. 11, 1993

[30] Foreign Application Priority Data

Apr. 30, 1992 [FI] Finland ................................ 921967

[51] Int. Cl.⁶ ........................... B29C 53/78; B29C 65/40
[52] U.S. Cl. ................. 156/244.13; 156/244.22; 156/244.27; 156/425; 156/429; 156/433; 156/447; 156/500
[58] Field of Search .................... 156/244.13, 244.22, 156/244.23, 244.24, 244.27, 191, 195, 322, 425, 428, 429, 433, 443, 446, 447, 500, 578; 138/154

[56] References Cited

U.S. PATENT DOCUMENTS

| | | | |
|---|---|---|---|
| 2,671,939 | 3/1954 | Everhart et al. | 156/244.13 |
| 3,839,126 | 10/1974 | Haller | 156/322 |
| 4,642,158 | 2/1987 | Steinel et al. | 156/578 |
| 5,271,794 | 12/1993 | Jarrell et al. | 156/578 |

FOREIGN PATENT DOCUMENTS

| | | |
|---|---|---|
| 0060482 | 9/1982 | European Pat. Off. . |
| 0223768 | 5/1987 | European Pat. Off. . |
| 0418760A2 | 3/1991 | European Pat. Off. . |
| 82635 | 12/1990 | Finland . |
| 1093546 | 11/1960 | Germany . |
| 1943549 | 3/1971 | Germany . |
| 3830627A1 | 9/1989 | Germany . |
| 206175 | 7/1966 | Sweden . |

*Primary Examiner*—Michael W. Ball
*Assistant Examiner*—Richard Crispino
*Attorney, Agent, or Firm*—Armstrong, Westerman, Hattori, McLeland & Naughton

[57] ABSTRACT

The present invention relates to a welding method in the manufacture of a spirally wound tube having a thermoplastic profile (1) of a mainly rectangular cross-section. A hole profile (1) is wound in a screw line form manner on a welding drum (2) simultaneously as profile surfaces (1a, 1b), which are to be welded together are heated with hot air to a desired temperature, whereafter a welding mass (S) is extruded onto the heated profile surfaces (1a, 1b) in two streams along each edge of the profile surface (1a, 1b) and the welding mass coated hole profile portions are pressed together by means of a press roller (10). The invention is characterized in that the welding is performed with a welding head (3) coupled to an extruder and provided with a welding keel (4), which from the outside is inserted between two profile surfaces (1a, 1b) to be welded together. Hot air ($L_1$, $L_2$) is blown out through two pairs of air openings (5, 7) in the welding keel (4) against the edge portions of the profile walls (1a, 1b). A keel nose (9) located between the two pairs of air openings is arranged to guide the four hot-air streams ($L_1$, $L_2$) and to prevent heating of the middle portion of the profile surfaces ($1_a$, $1_b$). The extruded welding mass (S) is pressed out on the heated portions of the profile surfaces (1a, 1b) through two pairs of welding mass openings (6, 8) in the rear section of the welding keel (4). The welding pressure is maintained on a desired level by regulating the friction between the hole profile (1) and the welding drum (2).

10 Claims, 3 Drawing Sheets

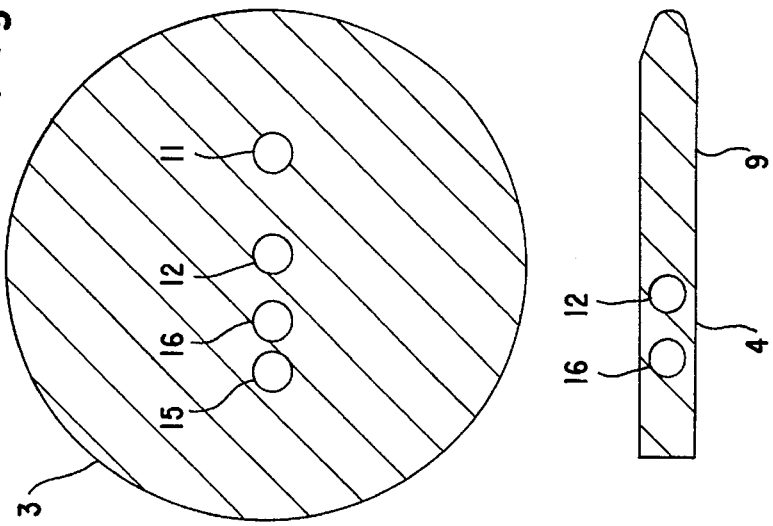
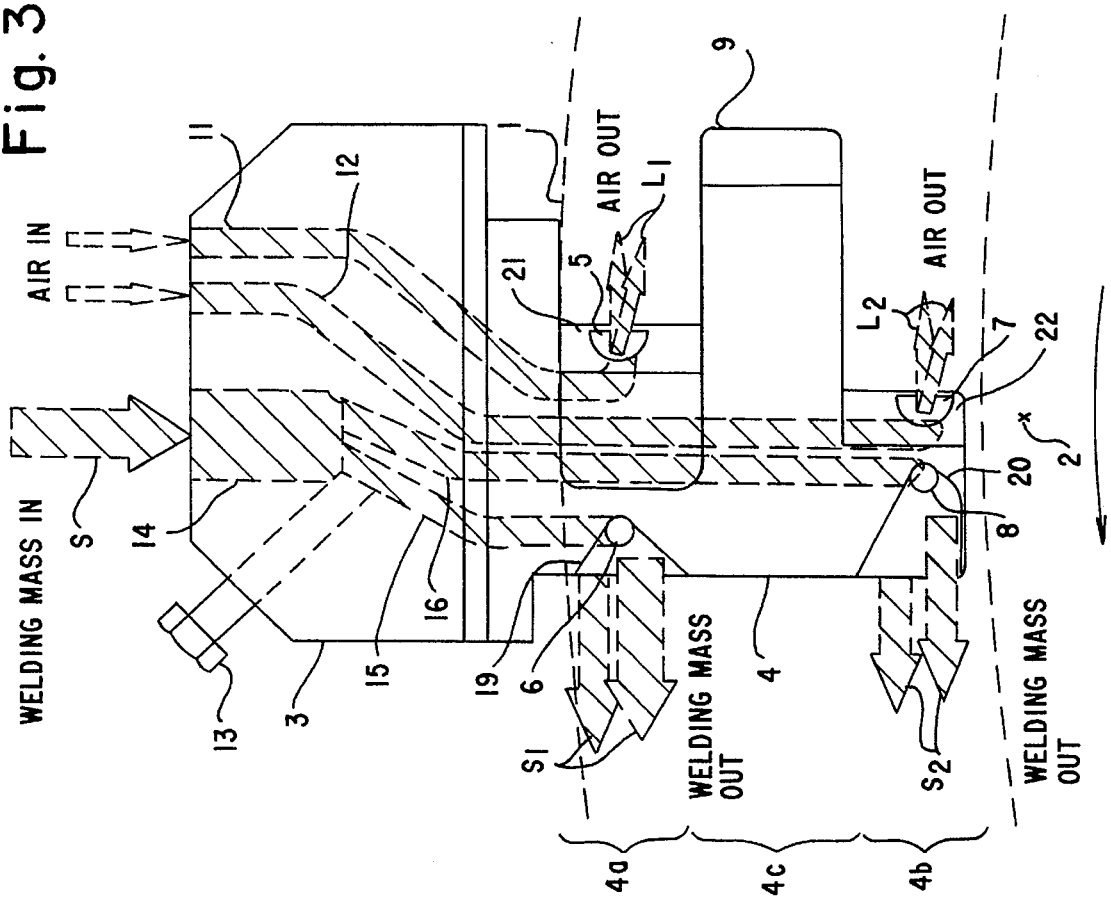

WELDING METHOD IN THE MANUFACTURE OF A SPIRALLY WOUND TUBE AND A WELDING HEAD FOR PERFORMING THE METHOD

BACKGROUND OF THE INVENTION

1. Field of the Invention

The present invention relates to a welding method in the manufacture of a spirally wound tube, as well as to a welding head for performing the method.

2. Description of the Relevant Art

Previously, welding of spirally wound tubes having a polyethylene hollow profile was performed in two steps. During a first rotation of a welding drum, whereby the hollow profile was provided around the welding drum, an inner seam was welded onto the closest previous winding of the hollow profile with a single welding keel; and during the following rotation, an outer seam was welded with a single extruder shoe.

A drawback of this previously used method is that it requires two extruders, and the controlling of the total welding operation is relatively difficult partially because the heating is carried out by means of hot-air insufflators, not integrated with the welding keel, so they have to be separately adjusted resulting in a very varying heating results, and partially because of great fluctuations in the welding pressure. This previously used welding method does not satisfy all the requirements for a good weld for a polyethylene, which especially concerns the outer seam.

A condition for a good weld seam in polyethylene is, besides cleanliness, the basic material being heated to correct temperature and the surfaces to be seamed together being pressed together under pressure.

SUMMARY OF THE INVENTION

The purpose of this invention is to provide a double weld seam, which satisfies all requirements and is also simple and reliable to perform. This is achieved with a method which includes the steps of winding a continuous thermoplastics hollow profile, having a substantially rectangular cross-section, helically around a welding drum; and inserting a welding keel of a welding head coupled to an extruder between a profile surface of the hollow profile entering the welding drum and an adjacent profile surface of a closest previous winding of the hollow profile around the welding drum, which profile surfaces are to be welded together. Such method further includes the steps of blowing hot air out through two pairs of air openings provided at a front portion of the welding keel facing a rotational direction of the hollow profile against edge portions of the adjacent profile surfaces; arranging a keel nose located between the two pairs of air openings to guide four hot-air streams from the two pairs of air openings and to prevent heating of a middle portion of the adjacent profile surfaces; and pressing out an extruded welding mass strand on each heated edge portion of the profile surfaces through two pairs of welding mass opening in a rear section of the welding keel, mainly onto the same level as the two pairs of air openings. The method of this invention further includes the steps of pressing the edge portions of the two adjacent profile surfaces coated with welding mass together by means of at least one press roller having an axis radially directed relative to the welding drum, so that a double weld seam is formed between each winding of the hollow profile; and maintaining a welding pressure on a desired level by regulating friction between the hollow profile and the welding drum.

The above-noted welding method of this invention, which provides a double weld seam in a simple and reliable way, resembles a pure butt welding. The fact that makes the method so attractive is that the welding occurs in one operation from the outside with only one extruder and that it is easy to reproduce.

These and other features of the invention will be understood upon reading of the following description along with the drawings.

BRIEF DESCRIPTION OF THE DRAWINGS

FIGS. 3, 3A and 3B show an outline diagram of a welding head according to the invention during a welding operation, seen partially in section as well as a cross-section of the welding head and of the nose of the keel.

DETAILED DESCRIPTION OF THE PREFERRED EMBODIMENTS

Figure 1:
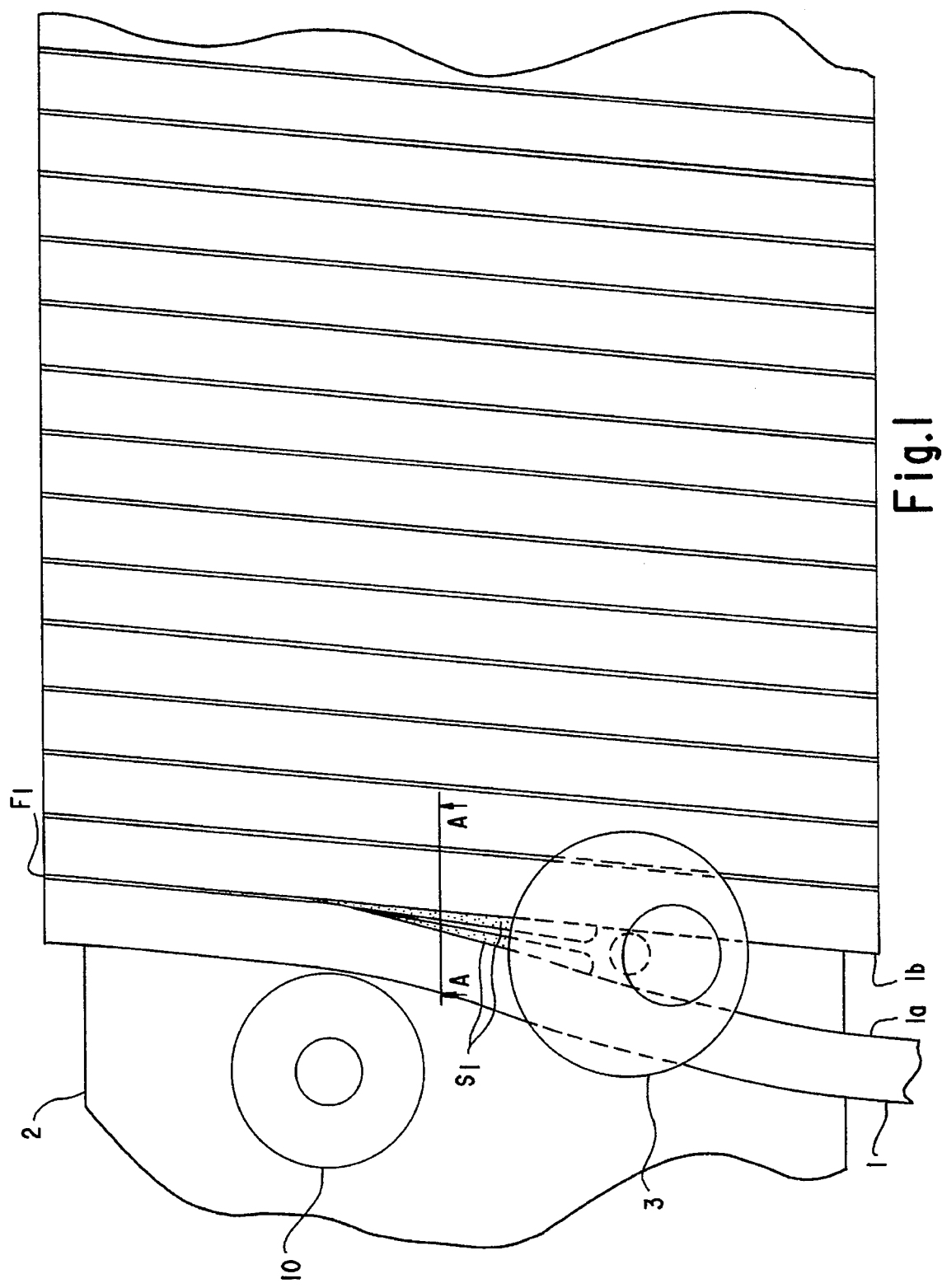
FIG. 1 shows an outline diagram of the manufacture of a spirally wound tube.

When manufacturing a spirally wound tube of a thermoplastic hollow profile 1 having a mainly rectangular cross-section, the hollow profile 1 is led to a rotatable welding drum 2, having a diameter corresponding to the inner diameter of a tube to be manufactured, whereby the hole profile 1 is helically wound around the welding drum 2. A welding head 3 provided with a welding keel 4 is inserted from the outside into a gap formed between the hollow profile 1 entering the welding drum 2, and that part of the hollow profile 1 previously wound around the welding drum. The welding head 3 is connected to an extruder (not shown), supplying welding mass S to the welding head 3 and connected to two hot-air sources (not shown). The length of the welding keel 4 corresponds mainly to the wall thickness of a completed tube, and the welding keel 4 is provided with three main zones. Closest to the welding head 3 is an upper welding zone 4a with a pair of openings 5 forward slantingly directed in the direction of rotation of the welding drum 2, through which openings 5 hot air $L_1$ is intended to be blown out against the upper portions of both profile surfaces 1a, 1b, which are to be welded together, and a pair of welding mass openings 6 on the rear edge of the welding keel 4 mainly on the same level as that of the pair of the air openings 5, and the welding mass $S_1$ extruded through these openings 6 is intended to be pressed out onto the portions of the profile walls 1a and 1b preheated by the hot-air streams $L_1$. This welding mass $S_1$ is intended to form an outer weld seam $F_1$. The lowermost section of the welding keel 4 forms a lower welding zone 4b, which is constructed in mainly the same way as the upper welding zone 4a with a pair of air openings 7 and a pair of welding mass openings 8, by means of which lower welding zone 4b an inner welding seam $F_2$ is intended to be formed. Between these two welding zones 4a and 4b, the welding keel 4 shows a central shadowing zone 4c with a forwardly directed keel nose 9, which is intended to guide the air streams $L_1$ and $L_2$ from the two pairs of air openings 5, 7 and to prevent overheating of the central portions of the two profile walls 1a, 1b, which are to be welded together, by preventing the hot air streams $L_1$ and $L_2$ from coming into direct contact with these portions. In connection with a strong overheating of the middle portion of the hollow profiles, a too soft and unstable profile is in fact obtained. In connection with thin-walled profiles 1, the keel nose 9 acts simultaneously as a support for the profile walls. The opposite portions of the hole profiles 1, which are coated with the welding mass $S_1$ and $S_2$, are pressed together by means of a press roller 10, the axis of which is radially directed in relation to the welding drum 2. The welding pressure achieved by the press roller 10 is maintained on a desired level by regulating the friction between the hollow profile 1 and the welding drum 2. Thus, according to this invention, a spirally wound tube with a double weld seam is obtained in one operation. In order to achieve an absolutely correct temperature in the outer and inner edge areas, respectively, of the profile walls 1a and 1b, the two pairs of air openings 5 and 7 are coupled to separate, individually adjustable air supply systems provided with their own hot air elements. The hot air steam $L_1$ to the upper pair of air openings 5 is led via a first air channel 11 and the hot air steam $L_2$ is led to the lower pair of air openings 7 via a second air channel 12. This structural arrangement makes it possible for an individual temperature regulation on the preheated portions of the hollow profile walls 1a and 1b by regulating the air temperature and the air temperature and the air stream for hot-air streams through each of the air channels 11 and 12 separately. The air temperature may preferably be controlled by means of temperature controllers arranged in the inlet channels for hot air connected to the welding head 3, and an air stream may preferably be read from flow meters, which may be installed into a feeding line in the corresponding air supply system.

The quantity of the welding mass S to be fed to the welding head 3 is regulated with the extruder, while the welding mass stream between the upper pair of the welding mass openings 6 and the lower pair of the welding mass openings 8 occurs by means of an adjusting screw 13 arranged on the welding head 3. The adjusting screw 13 may be, e.g., arranged to throttle the welding mass flow $S_1$ to the upper welding zone 4a substantially at a point where the main channel 14 for the welding mass is divided into two partial channels 15 and 16. With such a structural arrangement, one partial channel 15 leads to the pair of welding mass openings 6 in the upper welding zone 4a and the second partial channel 16 to the pair of welding mass openings 8 in the lower welding zone 4b. The two partial channels 15 and 16 are branched immediately before each pair of welding mass openings 6, 8 such that substantially identical welding mass strings are applied onto both hollow profile surfaces 1a and 1b. As an alternative to the case that only the shorter mass channel $S_1$ is provided with a throttle valve, both mass channels $S_1$ and $S_2$ may be provided with a throttle valve.

The width of the welding mass strands 17, 18 to be applied onto the preheated portions of the profile walls 1a and 1b are, in the first place, defined by the width of chamberings 19, 20, provided around each of the welding mass openings 6, 8, but also the amount of the applied welding mass affects the width of the welding mass strings 17, 18.

In order to maintain a direction, as optimal as possible, for each of the out-flowing hot-air streams $L_1$ and $L_2$, both pairs of air openings 5, 7 are preferably arranged in a plough-shaped bevelled front portion 21, 22 of each welding zone 4a and 4b, respectively. Each pair of air openings 5, 7 may, e.g., be achieved by dividing the mouth of each air channel $S_1$ and $S_2$, respectively, into a pair of air openings by means of a vertical cross bar or transverse beam, having an inwardly directed edge portion suitably shaped to contribute to the guiding of the corresponding hot-air streams $L_1$ and $L_2$, in a plough-formed manner.

The thickness of the welding keel 4 is mainly uniform in the region of the keel nose 9, which thickness, closest to the front tip of the keel nose, somewhat decreases, as is shown in the schematic cross-section of FIG. 3B. The welding head 3 itself has, as also shown in FIG. 3A, a mainly circular cross-section.

Figure 2:
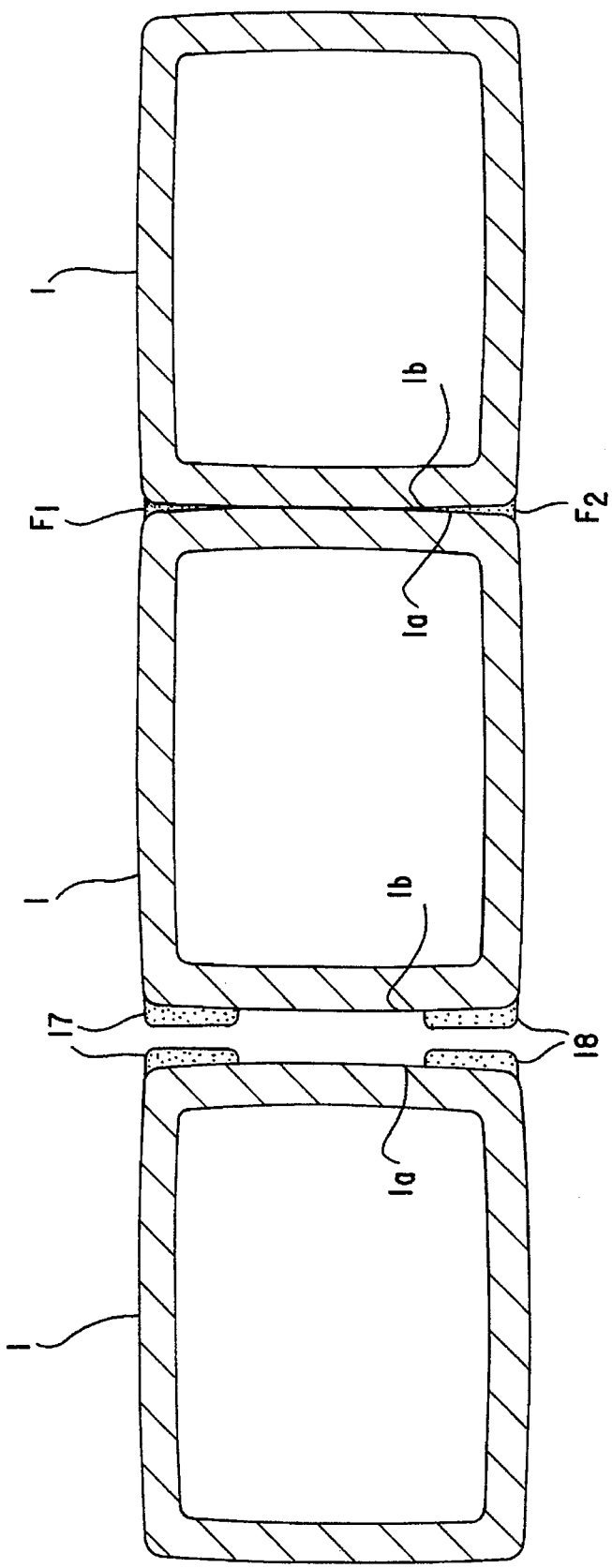
FIG. 2 shows an enlarged section of a tube wall of FIG. 1 along the line A—A.

FIG. 2 shows on the left gap between the hollow profiles 1, how the welding mass strings 17, 18 have been applied along the preheated upper and lower edge portions of the two hollow profile surfaces 1a and 1b, which are to be seamed together. In the right gap may be seen, the shape of a final double weld seam, when the welding pressure is adjusted onto such a level that the welding mass $S_1$ and $S_2$ from the upper 17 and the lower 18 welding mass strings coincide. The outer weld seam $F_1$ is preferably smoothed out by means of a teflon shoe (not shown), which is located against the outer surface of the welded profiles 1 immediately after compression with the press roller 10.

When the welding pressure is applied, the friction between the hollow profile 1 and the welding drum 2 may be regulated so that, for example, the welding drum 2 is cooled down, whereby the portions of the hollow profiles 1 located against the welding drum 2 shrink thereby resulting in a higher friction. Due to the fact that the welding pressure is regulated by varying the friction between the hollow profile 1 and the welding drum 2, a longer welding drum 2 is used according to the invention in relation to the connection in previous welding methods. The friction between the welding drum 2 and the hollow profile 1 may also be adjusted, totally mechanically, by using a welding drum 2 having a variable diameter. The amount of the friction may also be affected by varying the application tension of the profile 1 when it is wound onto the welding drum 2.

The invention is applicable to hollow profile of different thermoplastics materials, of which polyethylene and polypropene are most commonly used.

An advantage in connection with the welding method according to the invention is the fact that the welding is performed in one operation with a minimum of equipment and under fully controlled conditions relative to the application of the welding mass, adjustment of the welding pressure and the preheating of the profile surfaces to be seamed together.

While the invention has been particularly shown and described in reference to preferred embodiments thereof, it will be understood by those skilled in the art that changes in form and details may be made therein without departing from the spirit and scope of the invention.

We claim:

1. A welding method in the manufacture of a spirally wound tube, comprising the steps of:

winding a continuous thermoplastics hollow profile, having a substantially rectangular cross-section, helically around a welding drum;

inserting a welding keel of a welding head coupled to an extruder between a profile surface of the hollow profile entering the welding drum and an adjacent profile surface of a closest previous winding of said hollow profile around the welding drum, which profile surfaces are to be welded together;

blowing hot air out through two pairs of air openings provided at a front portion of the welding keel facing a rotational direction of the hollow profile against edge portions of said adjacent profile surfaces;

arranging a keel nose located between the two pairs of air openings to guide four hot-air streams from said two pairs of air openings and to prevent heating of a middle portion of said adjacent profile surfaces;

pressing out an extruded welding mass strand on each heated edge portion of the profile surfaces through two pairs of welding mass openings in a rear section of the welding keel, mainly onto a same level as the two pairs of air openings;

pressing said edge portions of the two adjacent profile surfaces coated with welding mass together by means of at least one press roller having an axis radially directed relative to the welding drum, such that a double weld seam is formed between each winding of the hollow profile; and maintaining a welding pressure on a desired level by regulating friction between the hollow profile and the welding drum.

2. A welding method according to claim 1, wherein the two pairs of air openings are connected to separate, individually adjustable air supply systems provided with hot air regulating elements for regulating temperature and air flow.

3. A welding method according to claim 2, wherein the amount of the welding mass is regulated by means of the extruder and a balancing of a welding mass stream between the two pairs of welding mass openings occurs by means of at least one adjusting screw arranged in the welding head.

4. A welding method according to claim 3, wherein the width of an applied welding mass strand is defined by a chambering received around each welding mass opening in the welding keel.

5. A welding method according to claim 4, wherein friction between the welding drum and the hollow profile is regulated by cooling down the welding drum.

6. A welding method according to claim 4, wherein friction between the welding drum and the hollow profile is regulated by varying the diameter of the welding drum.

7. A welding head for welding a continuous thermoplastics hollow profile in manufacturing a spirally wound tube, comprising:

a welding head which is coupled to an extruder and which has a welding keel insertable into a gap between two adjacent windings of said hollow profile, spirally wound around a welding drum, wherein the welding keel has three main zones including an upper welding zone with a pair of forward slantingly directed hot air openings on a front edge of the welding keel for blowing out hot air against each of profile walls, which are to be welded together, and a pair of welding mass openings on a rear edge of the welding keel for applying the welding mass on the profile surfaces preheated by hot-air streams for achieving an outer weld seam; a central shadowing zone with a forward directed keel nose; and a lower welding zone having a pair of hot air openings, and a pair of welding mass openings for achieving an inner weld seam.

8. A welding head according to claim 7, wherein the two pairs of hot air openings are arranged in a plough-shaped bevelled front portion of a corresponding welding zone as well as a chambering are received around each welding mass opening wherein the width of applied welding mass strings is defined by the size of the chambering.

9. A welding head according to claim 8, wherein the two pairs of hot air openings are connected to separate, individually adjustable hot air supply systems with hot-air regulating elements thereof for regulating the temperature and the air flow.

10. A welding head according to claim 9, further comprising at least one adjusting screw for balancing a welding mass stream to the pairs of welding mass openings of both welding zones.

* * * * *